United States Patent [19]

Sawada et al.

[11] 4,320,729
[45] Mar. 23, 1982

[54] SYSTEM FOR CONTROLLING IGNITION TIMING IN ENGINE

[75] Inventors: Daisaku Sawada; Takashi Shigematsu; Yuji Takeda, all of Shizuoka, Japan

[73] Assignee: Toyota Jidosha Kogyo Kabushiki Kaisha, Toyota, Japan

[21] Appl. No.: 42,343

[22] Filed: May 25, 1979

[30] Foreign Application Priority Data

May 26, 1978 [JP] Japan .................................. 53-63568

[51] Int. Cl.³ .............................................. F02P 5/14
[52] U.S. Cl. .................................... 123/425; 123/416; 123/479; 73/35
[58] Field of Search ............... 123/146.5 A, 425, 435, 123/479, 198 D, 416; 73/35

[56] References Cited

U.S. PATENT DOCUMENTS

| | | | |
|---|---|---|---|
| 3,916,848 | 11/1975 | Schmidt | 123/198 D |
| 4,002,155 | 1/1977 | Harned et al. | 73/35 |
| 4,120,272 | 10/1978 | Douaud et al. | 123/117 D |
| 4,153,020 | 5/1979 | King et al. | 123/146.5 A |
| 4,182,300 | 1/1980 | Ono et al. | 123/198 D |

Primary Examiner—Charles J. Myhre
Assistant Examiner—Andrew M. Dolinar
Attorney, Agent, or Firm—Cushman, Darby & Cushman

[57] ABSTRACT

A system for controlling ignition timing in an engine wherein a knocking signal is generated by a sensor in response to knocking. The operation of the sensor is monitored, and when a fault in its operation is detected, a dummy signal, instead of the knocking signal is used to control engine timing. The dummy signal causes the engine timing to be retarded to a value at which knocking is unlikely to occur.

3 Claims, 3 Drawing Figures

SYSTEM FOR CONTROLLING IGNITION TIMING IN ENGINE

BACKGROUND OF THE INVENTION

1. Field of the Invention

The present invention relates to a system for controlling ignition timing wherein knocking of an engine is detected, and ignition timing is instantly delayed in response to the detected knocking. More particularly, this invention is related to a system for controlling ignition timing wherein, when a knocking sensor is out of order, ignition timing is delayed by a predetermined value.

2. Prior Art

Knocking of an engine is a dangerous phenomenon which may destroy the engine in the worst case. Hence, in the conventional ignition system, ignition timing is retarded from the ideal (with respect to performance) to ensure that knocking will not occur. However, since it is not desirable from the viewpoint of economics of fuel consumption to delay ignition timing simply to ensure knocking does not occur, a system has been developed for controlling ignition timing wherein the occurrence of knocking is fed back to advance the timing toward the ideal to the greatest degree possible without the occurrence of knocking (for example, Japanese Patent Application Laid-Open (Kokai) No. 87537/1977).

Now, in the system for controlling ignition timing as described above, knocking is detected to feedback control the ignition timing, the ignition timing is delayed when knocking takes place, and the ignition timing is feedback controlled from engine conditions so as to advance the ignition timing to the limits of knocking when knocking does not occur. However, this system is disadvantageous in that, if a knocking sensor is out of order, the condition of knocking cannot be detected. Therefore the knocking sensor sends out a signal indicating that no knocking exists despite the fact that knocking is occurring. Thus, the ignition teimeing is unusually advanced to cause a violent knocking condition in the engine. In the worst case this results in the melting of the pistons and exhaust valves, which leads to the destruction of the engine.

SUMMARY OF THE INVENTION

One object of the present invention is to provide a system for controlling ignition timing wherein, when the knocking sensor is out of order, the ignition timing is automatically controlled to a predetermined value irrespective of the presence or absence of the condition of knocking, thereby preventing damage to the engine such as the melting of pistons and/or valves.

In the present invention, ignition timing is controlled by an (ignition timing) advance control circuit for receiving the detected rotating condition of the engine and the presence of knocking detected by a knocking sensor. The degree of advance is controlled in proportion to the rotating condition of said engine when no knocking takes place, and is delayed when knocking takes place.

The system includes a knocking sensor fault detecting circuit for detecting a fault of the knocking sensor; a dummy signal generating circuit generates a dummy signal to set the ignition timing at a predetermined position on the delay side when said knocking sensor fault detecting circuit detects a fault or constantly irrespective of the presence of knocking signal.

An advance control signal controlling adjusts ignition timing in response to an output signal fed from said dummy signal generating circuit in place of a knocking signal when a fault of knocking sensor is detected.

Thus, when the knocking sensor is normal, ignition timing is delayed by a knocking signal, and, when the knocking sensor is abnormal or out of order, ignition timing is delayed by a preset dummy signal, to thereby achieve the aforesaid object.

DETAILED DESCRIPTION OF THE INVENTION

Detailed description will hereunder be given of the present invention with reference to the embodiments.

Figure 1:
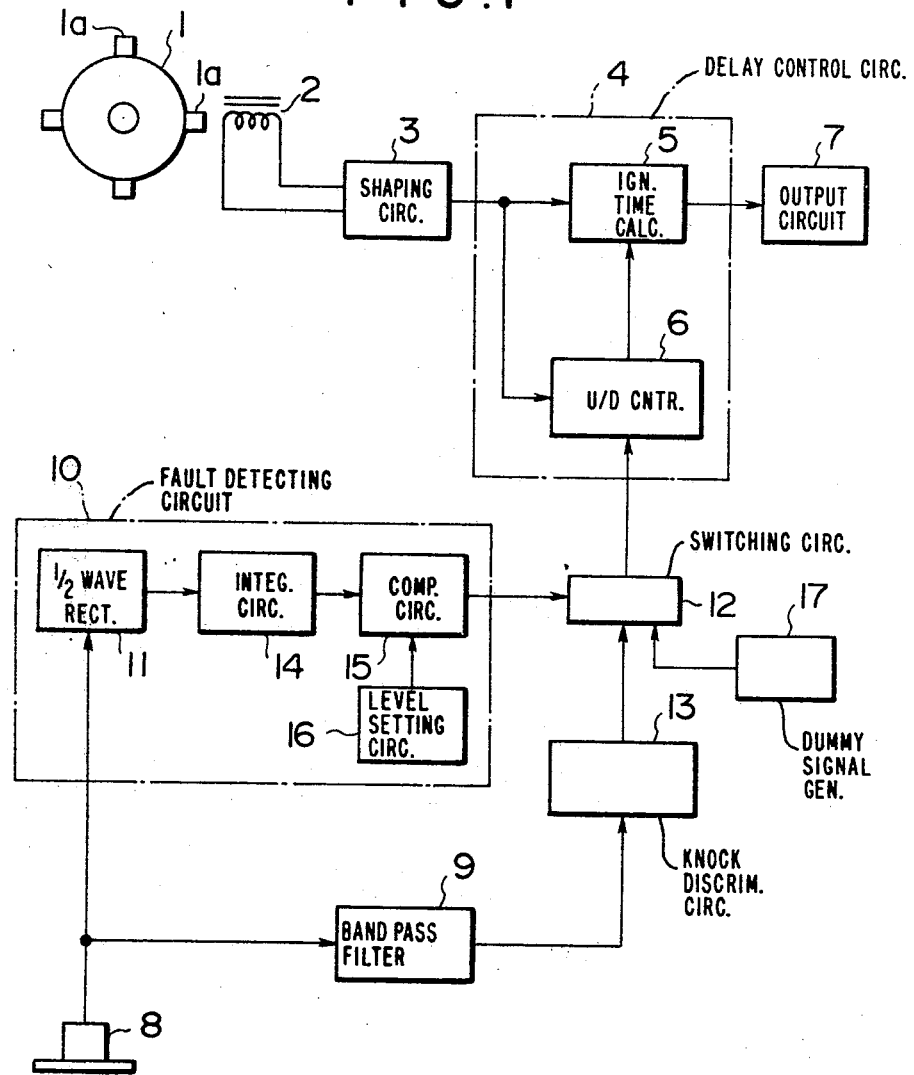
FIG. 1 is a circuit diagram showing one embodiment of the system for controlling ignition timing of an engine according to the present invention.

In FIG. 1, there is shown one embodiment of the system for controlling ignition timing according to the present invention.

Referring to the drawing, a pulse rotor 1, provided at the marginal portion thereof with a required number of projections 1a, is rotated by a crankshaft of an engine as is well known, and is mounted in a manner to be rotatable in the direction of advance by a centrifugal advance mechanism, vacuum advance mechanism or the like. Pickup 2 receives ignition pulses, which are applied to waveform shaping circuit 3. Said pulse rotor 1, pickup 2 and shaping circuit 3 constitute an ignition pulse detection circuit. Output pulses from the waveshape shaping circuit 3 are adapted to be fed to an ignition timing calculation circuit 5 and an updown counter 6 in a delay control circuit 4. Said ignition timing calculation circuit 5 generates a pulse in which the ignition pulse fed from the waveshape shaping circuit 3 is delayed by a value proportional to the output from the updown counter 6, and the arrangement of circuit thereof is well known, and hence, detailed description thereof will be omitted. Connected to the ignition timing calculation circuit 5 is an output circuit 7 for sending out a delay pulse fed from the ignition timing calculation circuit 5 as an ignition pulse. A knocking sensor 8 detects, for example, vibrations of the main body of the engine or sound waves caused by said vibrations and transduces them into electric signals. Connected to said knocking sensor 8 are a band pass filter 9 for allowing that portion of the output signal from said knocking sensor 8 within the knocking frequency band to pass therethrough and a half-wave rectification circuit 11 in a fault detecting circuit 10. Connected to said band pass filter 9 is a knocking discriminating circuit 13 for detecting signals fed from the band pass filter 9 which have a value larger in magnitude than a certain value and sending out a corresponding pulse to the updown counter 6 through a switching circuit 12. Connected to said switching circuit 12 is a dummy signal generating circuit 17 for constantly sending out a signal identical with the signal from knocking discriminating circuit 13 when knocking is detected.

The fault detecting circuit 10 comprises the half-wave rectification circuit 11, an integration circuit 14, a comparison circuit 15 and an abnormality level setting circuit 16. Half-wave rectification circuit 11 receives an output signal fed from the knocking sensor 8, half-wave rectifies it and sends it out to an integration circuit 14. Intergration circuit intergrates the half-wave rectified signal and converts the same into a DC voltage value corresponding to the signal amplitude. The signal sent out by said integration circuit 14 is fed to a comparison circuit 15. Said comparison circuit 15 is of such an arrangement that it compares an output signal fed from the integration circuit 14 with a preset voltage output signal fed from the abnormality level setting circuit 16, and sends out an output signal when the output signal fed from the integration circuit is less in value than the voltage output signal fed from the abnormality level setting circuit 16. The output signal from said comparison circuit 15 is fed to the switching circuit 12 connected thereto. The switching circuit 12 is of such an arrangement that, upon receiving an input signal from the comparison circuit 15, the switching circuit 12 discontinues to feed the signal from the knocking discriminating circuit 13 to the updown counter 6 and changes over to feed the signal from the dummy signal generating circuit 17 to the updown counter 6. When the signal from the comparison circuit 15, stops the switching circuit 12 is restored to the initial condition, i.e. the condition where the output signal from the knocking discriminating circuit 13 is fed to the updown counter 6. The updown counter 6 receives a pulse fed from the shaping circuit 3 as a reference pulse in its down input, and, receives a pulse fed from the knocking discriminating circuit 13 in its up input, and feeds a count output corresponding to the difference between said two input pulses to the aforesaid ignition timing calculation circuit 5. In passing, the reference pulse fed to the updown counter 6 is not limited to the pulse corresponding to the rotation of the engine like the ignition impulse, but may be an oscillation pulse oscillating at a given cycle.

In said system for controlling ignition timing, when the engine is rotated, ignition pulses generated in the pickup 2 is converted to a rectangular wave in the shaping circuit 3. A signal detected by the knocking sensor 8 is fed through the band pass filter 9 to the knocking discriminating circuit 13 which sends out one pulse per ignition cycle in which knocking occurs. When the ignition pulses are fed to the updown counter 6 through the shaping circuit 3, said updown counter 6 down-counts one count per pulse signal fed from the shaping circuit 3. Upon receiving a pulse signal from the knocking discriminating circuit 13, said updown counter 6 up-counts one count. And, the ignition timing calculation circuit 5 delays an ignition pulse fed from the shaping circuit 3 in proportion to the value of stored in the updown counter 6. The delayed ignition pulse is fed to the output circuit 7 to thereby determine ignition timing. The signal from the knocking sensor 8 is also fed to the fault detecting circuit 10. The signal from the knocking sensor 8 is fed to the half-wave rectification circuit 11 of the fault detecting circuit 10 to be half-wave rectified. A half-wave rectified pulse fed from the half-wave rectification circuit 11 is integrated by the integration circuit 14, and converted into a DC voltage value corresponding to the signal amplitude. The DC voltage value thus converted is fed to the comparison circuit 15, and compared with a preset voltage value in the abnormality deciding level setting circuit 16.

When the voltage signal fed from the abnormality level setting circuit 16 is larger in value than the voltage signal fed from the integrating circuit 14, i.e. the knocking sensor 8 is out of order, a signal is sent out from the comparison circuit 15 to actuate the switching circuit 12. When the switching circuit is actuated, it discontinues to feed the signal from the knocking discriminating circuit 13 and changes over to feed the signal from the dummy signal generating circuit 17, which constantly sends out a signal identical with that of discriminating circuit 13 during knocking to the updown counter 6. Additionally, when no signal is received from the comparison circuit 15 to the switching circuit 12, the switching circuit 12 constantly feeds the output signal from the knocking discriminating circuit 13 to the updown counter 6. Upon receiving a signal from the dummy signal generating circuit 17, the updown counter 6 is saturated to the maximum countable value which is preset, and the ignition timing calculation circuit 4 feeds the maximum delay value to the output circuit 7 to decide the ignition timing.

Consequently, the abnormality of the knocking sensor is discriminated from the signal fed from the knocking sensor itself, whereby the ignition timing is set at the predetermined position on the more delay side than the region of ordinary use when the knocking sensor is normal, thereby eliminated engine damage such as melting, losses of pistons, and the like.

Figure 2:
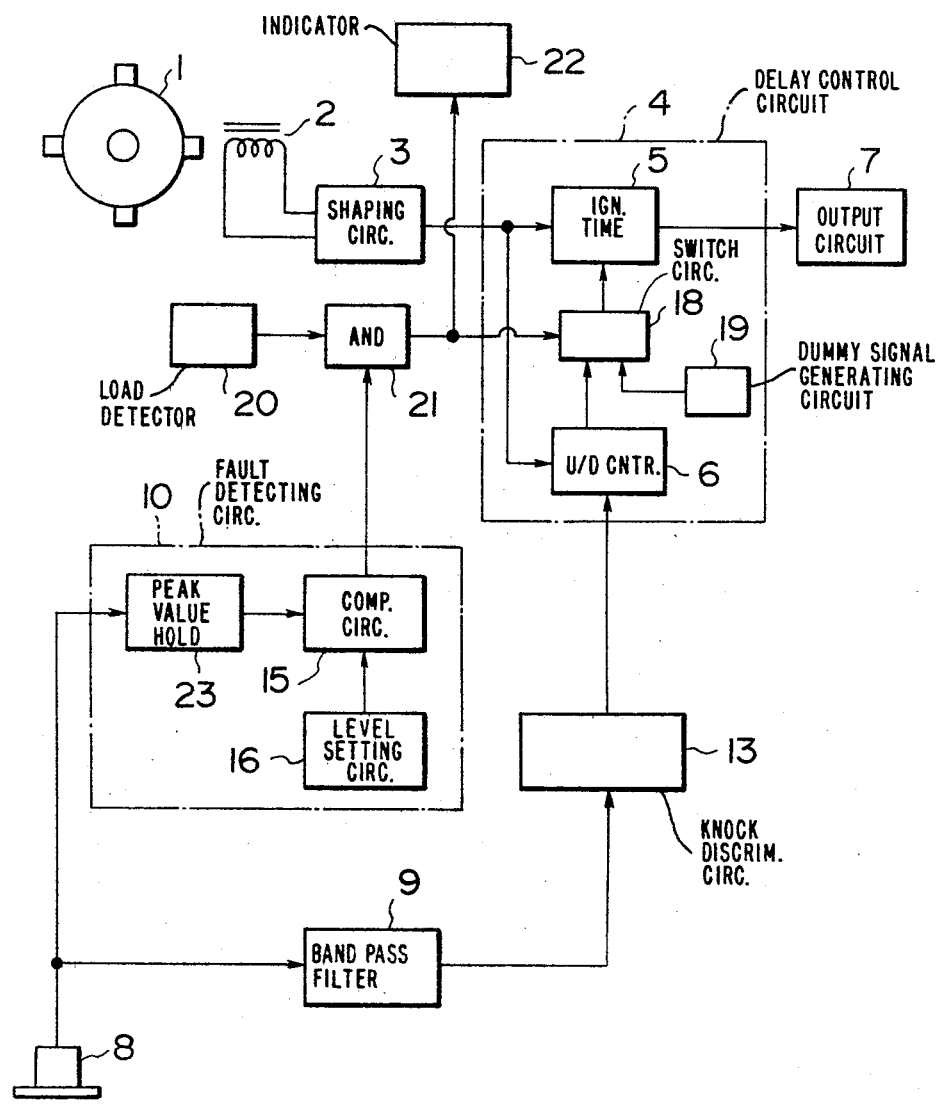
FIG. 2 is a circuit diagram showing one embodiment of the system for controlling ignition timing by use of a circuit for detecting a fault of the knocking sensor and a circuit for detecting the engine load in an engine.

FIG. 2 shows another embodiment of the present invention.

In the drawing, the fault detecting circuit 10 is provided therein with a peak value holding circuit 23 in place of the half-wave rectification circuit 11 and integrating circuit 14 as shown in FIG. 1. Said peak value holding circuit 23 holds the peak value of the signal fed from the knocking sensor 8 and feeds the same to the comparison circuit 15. Said comparison circuit 15 compares the output signal fed from the peak value holding circuit 23 with a preset signal fed from the abnormality level setting circuit 16, and feeds an output signal when the peak value of the output signal fed from the peak value holding circuit 23 is lower than the value of the output signal fed from the abnormality level setting circuit 16. The output signal from said comparison circuit 15 is fed to an "AND" circuit 21 connected to said comparison circuit 15. Connected to the "AND" circuit 21 is an engine load detecting means 20 for detecting the engine load by a suitable method and sending out an output signal when the load is higher than the predetermined value. Said "AND" circuit 21 is adapted to feed an output to the switching circuit 18 when "and" is achieved by an output signal from the comparison circuit 15 and an output signal from the engine load detecting means 20. Additionally, an output from the "AND" circuit 21 is fed to an indicating means 22, whereby abnormality of the knocking sensor 8 is indicated. Said switching circuit 18 is interposed between the ignition timing calculation circuit 5 in the delay control circuit 4 and the updown counter 6, and is adapted, upon receiving an output from the "AND" circuit 21, to discontinue to feed the signal fed from the updown counter 6 and change over to feed the digital signal fed from the dummy signal generating circuit 19 to the ignition timing calculation circuit 5.

The signal fed from the knocking sensor 8 is converted to a DC voltage value by the crest value holding circuit 23, and compared with an output voltage fed from the abnormality level setting circuit 16, whereby the presence of abnormality of the knocking sensor is decided likewise in the embodiment shown in FIG. 1. More particularly, a voltage output signal fed from the peak value holding circuit 23 is compared with a voltage output signal fed from the abnormality level setting circuit 16 connected to the comparison circuit 15 in said comparison circuit 15, it is decided that the knocking sensor 8 is out of order when the voltage output signal fed from the peak value holding circuit 23 is lower in value than the voltage output signal fed from the abnormality level setting circuit 16, so that the comparison circuit 15 feeds a signal to the "AND" circuit 21. On the other hand, when the engine load detected by the suitable method is higher than the preset value, the engine load detecting means feeds a signal to the "AND" circuit 21. When "AND" is achieved by the output signal fed from the comparison circuit 15 and the output signal fed from the engine load detecting means 20, the "AND" circuit 21 feeds a composite signal to the switching circuit 18. Upon receiving the signal from the "AND" circuit 21, the switching circuit 18 discontinues to feed the signal from the updown counter 6 and changes over to feed the digital signal from the dummy signal generating circuit 19 to the ignition timing calculation circuit 5.

Consequently, in the present embodiment, a simple circuit can detect the presence of abnormality of the knocking sensor, and moreover, even in the case the knocking sensor is out of order, in order to eliminate the loss in the engine performance within the light load region which is not involved with knocking, the adoption of treatment based on the decision of the presence of abnormality of the knocking sensor can be automatically selected according to the load condition of the engine. Furthermore, it is avoided to shift said value to the delay side much apart from the region of ordinary use for safety allowance. On the contrary, said value is shifted to the delay side only slightly apart from the region of ordinary use. And, the operator may be warned of the abnormality in a separate way from the above.

Figure 3:
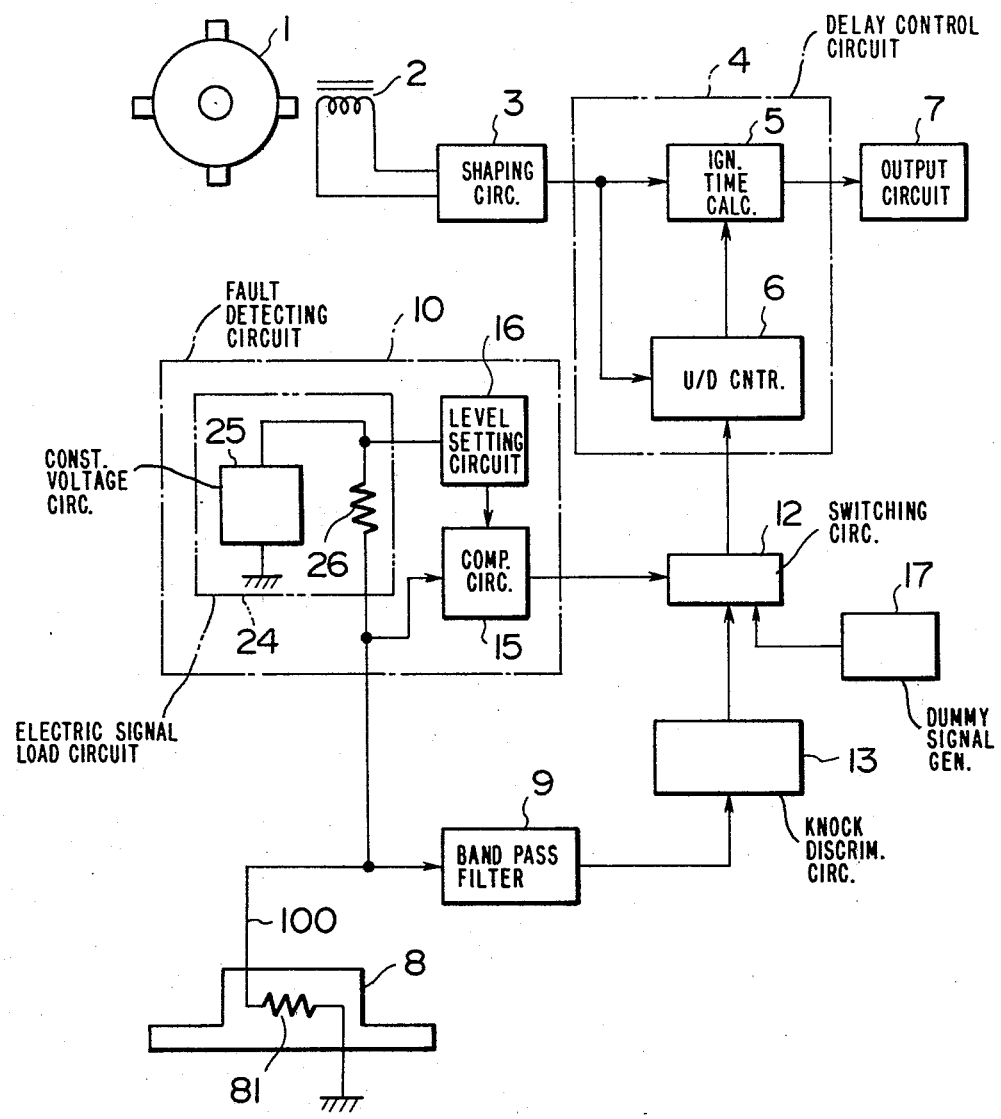
FIG. 3 is a circuit diagram showing one embodiment of the system for controlling ignition timing of an engine wherein a fault of the knocking sensor is detected by use of a constant-voltage circuit.

FIG. 3 shows still another embodiment. The difference of this embodiment from the first embodiment shown in FIG. 1 resides in that an electric signal load circuit 24 is inserted in place of the half-wave rectification circuit 11 and the integrating circuit 14 in the fault detecting circuit 10. Said electric signal load circuit 24 comprises a constant-voltage circuit 25 and a resistance 26 which is serially interposed between the constant-voltage circuit 25 and the knocking sensor 8. Said resistance 26 is connected at one side of the constant-voltage circuit to the abnormality level setting circuit 16 and at the other side of the knocking sensor to the comparison circuit 15.

The fault of the knocking sensor 8 is detected in the following way. If an output voltage from the constant-voltage circuit 25 is applied to an internal resistance 81 in the knocking sensor 8 through the resistance 26, then a voltage value divided to the resistance 26 and the internal resistance 81 is generated in a knocking sensor signal wire 100. Said voltage value is fed to the comparison circuit 15 and compared with a voltage value fed from the abnormality level setting circuit 16 in the comparison circuit 15. When the voltage value fed from the abnormality level setting circuit 16 is lower than the divided voltage value fed to the comparison circuit 15, it is decided that the knocking sensor 8 is out of order, an output is fed from the comparison circuit 15 of the fault detecting circuit 10 to the switching circuit 12, whereby the switching circuit 12 is switched, so that an output signal from the dummy signal generating circuit 17 is fed to the updown counter 6. Others are the same as that described in FIG. 1.

Therefore, in the present embodiment, a specified electric signal is fed to the knocking sensor, and the abnormality of the knocking sensor may be known from the condition of said electric signal being transmitted.

What is claimed is:

1. A system for controlling ignition timing of an engine comprising:
    means for generating an operation signal related to an operating condition of said engine;
    means for generating a knocking signal related to knocking in said engine;
    means for controlling said ignition timing in response to said operation signal and said knocking signal;
    means for integrating said knocking signal;
    means for generating a fault signal when said integrated knocking signal is beyond a predetermined threshold;
    means for generating a dummy signal, said dummy having the effect of retarding said ignition timing to a timing at which knocking is unlikely to occur when said dummy signal is applied to said controlling means; and
    means for substituting said dummy signal for said knocking signal to said controlling means in response to said fault signal.

2. A system for controlling ignition timing of an engine comprising:
    means for generating ignition pulses related to the rotation of said engine;
    means for generating a knocking signal related to knocking in said engine;
    updown counting means for down-counting in response to each of said ignition pulses and up-counting in response to each knocking signal;
    means for controlling said ignition timing in response to the count stored in said updown counting means;
    means for half-wave rectifying said knocking signal;
    means for integrating said half-wave rectified knocking signal to generate a modified knocking signal;
    means for generating a fault signal when said modified knocking signal is beyond a predetermined threshold;
    means for generating a dummy signal, said dummy signal having the effect of retarding said ignition timing to a timing at which knocking is unlikely to occur when said dummy signal is applied to said controlling means; and
    means for substituting said dummy signal for said knocking signal to said updown counting means in response to said fault signal.

3. A system for controlling ignition timing of an engine comprising:
    means for generating ignition pulses related to the rotation of said engine;
    means for generating a knocking signal related to knocking in said engine;
    means for controlling said ignition timing in response to said ignition pulses and said knocking signal;
    means for half-wave rectifying said knocking signal;

means for integrating said half-wave rectified knocking signal to generate a modified knocking signal;
means for generating a fault signal when said modified knocking signal is beyond a predetermined threshold;
means for generating a dummy signal, said dummy having the effect of retarding said ignition timing to a timing at which knocking is unlikely to occur when said dummy signal is applied to said controlling means; and
means for substituting said dummy signal for said knocking signal to said controlling means in response to said fault signal.

* * * * *